United States Patent
Yang et al.

(10) Patent No.: US 11,795,635 B2
(45) Date of Patent: Oct. 24, 2023

(54) INTELLIGENT INTEGRATED ANTI-COLLISION SYSTEM AND METHOD FOR PIER

(71) Applicant: SHANDONG UNIVERSITY, Jinan (CN)

(72) Inventors: Zeying Yang, Jinan (CN); Jianbo Qu, Jinan (CN); Shucai Li, Jinan (CN); Qingsong Zhang, Jinan (CN); Zhi Ge, Jinan (CN); Xiaoyan Ding, Jinan (CN); Hongwu Liu, Jinan (CN); Fengjin Zhao, Jinan (CN); Yuhui Shan, Jinan (CN); Xiaobin Fan, Jinan (CN); Peng Zhang, Jinan (CN); Xinghua Xi, Jinan (CN); Youzhi Wang, Jinan (CN); Hetao Hou, Jinan (CN); Li Tian, Jinan (CN); Ke Wu, Jinan (CN); Yongye Qu, Jinan (CN); Yalei Zhang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 744 days.

(21) Appl. No.: 16/969,125

(22) PCT Filed: Jun. 19, 2019

(86) PCT No.: PCT/CN2019/091907
§ 371 (c)(1),
(2) Date: Aug. 11, 2020

(87) PCT Pub. No.: WO2020/237752
PCT Pub. Date: Dec. 3, 2020

(65) Prior Publication Data
US 2023/0146650 A1    May 11, 2023

(30) Foreign Application Priority Data
May 30, 2019    (CN) .......................... 201910463926.7

(51) Int. Cl.
*E01D 19/02* (2006.01)
*E01D 101/26* (2006.01)
(Continued)

(52) U.S. Cl.
CPC ........ *E01D 19/02* (2013.01); *E01D 2101/268* (2013.01); *E02B 3/28* (2013.01); *E02B 17/003* (2013.01)

(58) Field of Classification Search
CPC ..... E01D 19/02; E01D 2101/268; E02B 3/28; E02B 17/003
See application file for complete search history.

(56) References Cited

U.S. PATENT DOCUMENTS 4,072,022 A    2/1978 Shimizu

FOREIGN PATENT DOCUMENTS

| CN | 103195023 A | 7/2013 |
| CN | 203307775 U | 11/2013 |

(Continued)

OTHER PUBLICATIONS

Feb. 24, 2020 International Search Report issued in International Patent Application No. PCT/CN2019/091907.

(Continued)

*Primary Examiner* — Kyle Armstrong
(74) *Attorney, Agent, or Firm* — Oliff PLC

(57) ABSTRACT

An intelligent integrated anti-collision system and method for a pier, including: a radar sensing device disposed at the joint between the pier and a girder, image collection devices disposed around the pier, control system, hydraulic system and execution device, where the radar sensing and image collection devices transmit collected signals to the control system, which uses the hydraulic system to control the action of the execution device; the execution device is disposed at a middle part of the pier and includes a plurality (Continued)

of sections of steel-reinforced rubber concrete girder connected end to end through pulleys, the hydraulic system can drive the pulleys to rotate to enable the sections to be located on the same horizontal line, and an energy dissipation apparatus is disposed at the tail end of the last section to realize energy dissipation of the energy generated by impact when an object impacts the energy dissipation apparatus.

9 Claims, 2 Drawing Sheets

(51) Int. Cl.
*E02B 3/28* (2006.01)
*E02B 17/00* (2006.01)

(56) References Cited

FOREIGN PATENT DOCUMENTS

| | | | |
|---|---|---|---|
| CN | 205259117 U | | 5/2016 |
| CN | 106971631 A | * | 7/2017 |
| CN | 107358818 A | | 11/2017 |
| CN | 109555010 A | | 4/2019 |
| JP | H08-20932 A | | 1/1996 |

OTHER PUBLICATIONS

Feb. 24, 2020 Written Opinion of the International Searching Authority issued in International Patent Application No. PCT/CN2019/091907.

* cited by examiner

INTELLIGENT INTEGRATED ANTI-COLLISION SYSTEM AND METHOD FOR PIER

BACKGROUND

Technical Field

The disclosure relates to the technical field of collision prevention of piers, and particularly relates to an intelligent integrated anti-collision system and method for the pier.

Related Art

In recent years, with the rapid development of China's economy, cross-sea and cross-river bridges have been continuously constructed, and more bridges will emerge in the future. With the development of the transportation industry, water transportation will be more and more busy, ships are increasing, the cargo transportation volume is increasing, and the overall tonnage of the ships is getting higher and higher. With the increase of bridges, many non-navigable areas have also become navigable areas, increasing the difficulty of ship traffic. Therefore, people pay special attention to collision prevention of the piers.

In recent years, there have been many bridge collapse accidents in the world due to the collision of the piers. According to statistics, from 1960 to 2007, 34 important bridges in the world were collapsed due to ship collision, causing death of 346 people.

Compared with piers in navigable areas, piers in non-navigable areas of bridges are relatively weak in strength and slightly insufficient in collision resistance. Furthermore, in large bridges, the non-navigable areas have a larger span and are more prone to collision. Therefore, it is necessary to study the collision prevention of the pier.

The inventors found in the research that the collision prevention of the piers is mainly divided into the active collision prevention and the passive collision prevention. The passive collision prevention means that blocking and a pier protecting devices are disposed around the pier. The active collision prevention means that the distance between navigable channels is increased, or a ship gives a warning before impacting the pier. However, it can only play an auxiliary role and cannot fundamentally solve the problem of impact on the pier. Most of the common anti-collision measures are passive defense which is the last line of defense of the pier, and there are few studies on the active anti-collision facilities at present.

SUMMARY

The objective of the implementation of this specification is to provide an intelligent integrated anti-collision system for a pier, which can automatically identify the approach of ships, actively protect the pier, eliminate a collision kinetic energy and better protect the pier, and the passive anti-collision measures are set on the basis of the active anti-collision measures so as to eliminate the collision kinetic energy and fully protect the pier.

Furthermore, a sailing ships can be pushed away from the pier in time so as to protect the ships and reduce or avoid casualties.

An implementation of this specification provides an intelligent integrated anti-collision system for a pier, which is realized through the following technical solution:

Including:
- a radar sensing device disposed at a joint between the pier and a girder, image collection devices disposed around the pier, a control system, a hydraulic system and an execution device;
- the radar sensing device and the image collection devices transmit collected signals to the control system, and the control system uses the hydraulic system to control the action of the execution device; and
- the execution device is disposed at a middle part of the pier and includes a plurality of sections of steel-reinforced rubber concrete girders connected end to end, the girders are connected through pulleys, the hydraulic system can drive the pulleys to rotate so as to enable the plurality of sections of girders to be located on the same horizontal line, and an energy dissipation apparatus is disposed at the tail end of the last girder section so as to realize energy dissipation of the energy generated by impact when an object impacts the energy dissipation apparatus.

In a further technical solution, a passive anti-collision apparatus is further disposed at a lower-middle part of the pier.

An implementation of this specification provides an intelligent integrated anti-collision method for a pier, which is realized through the following technical solution:

Including:
- collecting and transmitting a distance signal and an image signal of an object close to the pier from the pier to a controller system;
- controlling a hydraulic system by a control system to drive pulleys to rotate so as to enable a plurality of sections of girders to be located on the same horizontal line; and
- when an object impacts an energy dissipation apparatus disposed at the tail end of the girder section, realizing energy dissipation of the energy generated by impact when the object impacts the energy dissipation apparatus.

Compared with the prior art, the disclosure has the following beneficial effects:

In the disclosure, the approach of ships is automatically identified through the radar sensing device to actively protect the pier, eliminate collision kinetic energy and better protect the pier, and passive anti-collision measures are set on the basis of active anti-collision measures so as to eliminate the collision kinetic energy and fully protect the pier. Furthermore, sailing ships can be pushed away from the pier in time so as to protect the ships and reduce or avoid casualties.

The disclosure is mainly based on active anti-collision measures supplemented by passive anti-collision measures, so that active collision prevention and passive collision prevention are combined to fully protect pier.

BRIEF DESCRIPTION OF THE DRAWINGS

The accompanying drawings constituting a part of the present disclosure are used for providing further understanding for the present disclosure. Exemplary embodiments of the present disclosure and descriptions thereof are used for explaining the present disclosure and do not constitute an improper limitation to the present disclosure.

In figures: 1 denotes a radar sensing device; 2 denotes a high-definition camera; 3 denotes a control system; 4 denotes a hydraulic system; 5 denotes steel-reinforced rubber concrete; 6 denotes a pulley; 7 denotes a hydraulic oil cylinder; 9 denotes a steel plate; 10 denotes a rubber damping block; 11 denotes a steel structure fender; and 12 denotes a rubber fender.

DETAILED DESCRIPTION

It should be noted that the following detailed descriptions are all exemplary and are intended to provide a further understanding of the present disclosure. Unless otherwise specified, all technical and scientific terms used herein have the same meaning as commonly understood by those of ordinary skill in the art to which the present disclosure belongs.

It should be noted that terms used herein are only for describing specific implementations and are not intended to limit exemplary implementations according to the present disclosure. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Embodiment I

Figure 1:
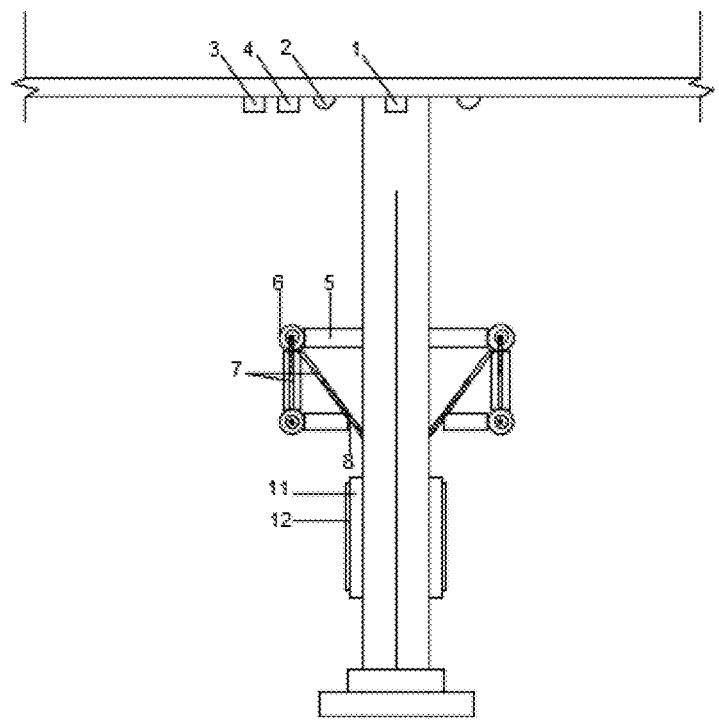
FIG. 1 is a plan view of an active anti-collision system according to an embodiment of the disclosure.

The present embodiment discloses an intelligent integrated anti-collision system for a pier. Referring to FIG. 1, a sensing device is disposed at a joint between a pier and a girder, a certain number of high-definition cameras are disposed around the pier in 360°, an inclination angle of each of the high-definition cameras can be adjusted according to a radar setting range so that the cameras can shoot safe distance edges, the high-definition cameras perform uninterrupted shooting, and meanwhile, the radar sensing device receives signals.

In an embodiment, the sensing device can also be disposed at other places as long as it senses the safe distance of ships.

The sensing range of the radar sensing device is set to be the safe distance of the pier according to an empirical formula. The empirical formula according to which the sensing range of the radar sensing device is set is as follows:

$D=(0.56B+0.26)U^{0.35}$, where

B represents characteristic width of pier; and
U represents average flow velocity of channel inflow.

The signals collected by the high-definition cameras and the radar sensing device are transmitted to a control system 3, and the control system sends an instruction to a hydraulic system 4 after receiving the signals.

The control system receives the signals and sends the instruction. The control system is disposed at the lower edge of the girder near the pier, and steel plates are welded at the periphery.

In a specific embodiment, a neural system and the hydraulic system are disposed in welded steel boxes, and the steel boxes are anchored at the lower edge of the girder through anchor bolts. For the steel box of the hydraulic system, a channel should be reserved, and a ladder is welded from the upper edge to the lower edge of a main girder and is welded with the channel so as to facilitate fueling of a diesel engine.

In the above solution, a power component in the hydraulic system is the diesel engine which receives the instruction and starts working. The diesel engine converts the chemical energy of diesel into mechanical energy, and then converts the mechanical energy into hydraulic energy through a hydraulic pump.

In the above solution, execution components in the hydraulic system are hydraulic oil cylinders and are connected with the execution device so as to guide the execution device to work. The power component, the execution components, the hydraulic pump, a distribution valve and the like form the entire hydraulic system. The entire working components except the execution components are disposed at the lower edge of the girder beside the neural system, the steel boxes are welded at the periphery, the channel is reserved, and the ladder is welded from the upper edge to the lower edge of the main girder and is welded with the channel.

Figure 2:
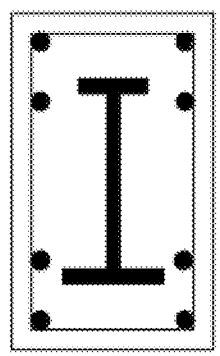
FIG. 2 is a sectional view of a steel-reinforced rubber concrete girder according to an embodiment of the disclosure.

In the above solution, as shown in FIG. 2, the execution device uses 3 sections of small steel-reinforced rubber concrete girders. The first section of girder is close to the pier, and the first section of girder, the second section of girder and the third section of girder are sorted sequentially. Steel bars are disposed around I-steel and rubber concrete is poured so that the I-steel part and the reinforced concrete part are integrated. Compared with reinforced concrete, the steel-reinforced concrete has better seismic performance and higher construction speed. Compared with common concrete, the rubber concrete has better compression resistance and impermeability.

Steel bars are pre-buried on the pier, and a bolting and welding combined joint construction manner is adopted at a joint of the pier spliced with the first section of girder. The girders are connected through large pulleys, the tail end of the previous section of girder is welded with a pulley spindle and reinforced with an anchor rod, and the front end of the next section of girder welds and reinforces the steel bars and the pulley. One end of one hydraulic oil cylinder is welded with the pulley spindle, and the other end is hinged to a pulley of the next section. The other end of the hydraulic oil cylinder connected with the first pulley is welded with reserved steel bars of the pier.

When the sections of steel-reinforced rubber concrete girders 5 are prefabricated, parts of steel frames are reserved at both ends to facilitate subsequent connection.

During specific implementation, the first girder section is welded and reinforced with the pre-buried steel bars in the pier, and the other end of the girder is welded with the pulley spindle and reinforced with an anchor rod. One end of the second section of girder is welded and reinforced with a pulley (6), and the other end is also welded and reinforced with the pulley spindle. One end of the third section of girder is welded and reinforced with the pulley (6). Anti-rust treatment needs to be performed on exposed steel bars.

The hydraulic system allocates the hydraulic pressure to hydraulic oil cylinders (7) to convert hydraulic energy into mechanical energy. One end of one hydraulic oil cylinder (7) is welded with the reserved steel bars of the pier, and the other end is hinged to one pulley (6). One end of the other hydraulic oil cylinder (7) is welded with a pulley spindle, and the other end is hinged to the other pulley (6). Visibly, corresponding hydraulic oil cylinders are disposed on both sides of the two pulleys (6).

The hydraulic oil cylinders (7) start to work to drive the pulleys (6) to rotate, and then, the second girder section and the third girder section are lifted successively, so that the three sections of girders are located on the same horizontal line, and the same horizontal line can enable the length of an anti-collision arm to be maximum.

A steel plate with a certain thickness is provided at the tail end of the last girder section, bolts are pre-buried at the tail end of the girder section, and the steel plate (9) is reserved with a circular hole. A rubber damping block (10) is provided on an outer side of the steel plate and is reserved with a circular hole, and a steel plate (9) is provided on an outer side of the rubber damping block (10) and is reserved with a circular hole. Each of the pre-buried bolts sequentially passes through the circular holes reserved in the steel plate (9), the rubber damping block (10) and the steel plate (9), and the outermost steel plate is fixed through nuts. If a ship collides with an active anti-collision facility, the rubber damping block (10) and the steel plates (9) work together to play a role in energy dissipation. The entire anti-collision arm is disposed near a position above the normal water level.

Figure 3:
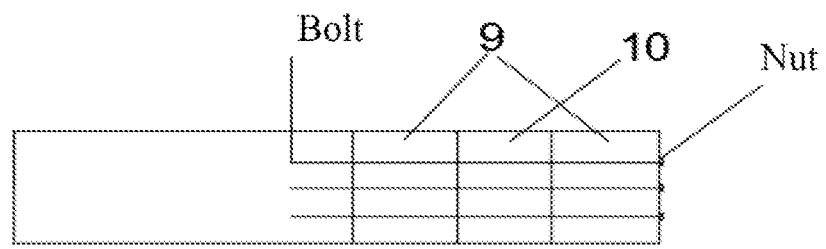
FIG. 3 is a plan view of steel plates and a rubber damping block according to an embodiment of the disclosure.

As shown in FIG. 3, a steel plate, the rubber damping block and the steel plate are sequentially installed at the tail end of the third section of the girder. The three parts work together to better play a role in dissipating the collision kinetic energy. Four entire active anti-collision facilities are symmetrically distributed around the pier to fully protect the pier. The entire active anti-collision facility include concrete arms, damping blocks and the steel plates.

In the above solution, the final anti-collision measure uses a rubber and the steel structure fender. The steel structure fender is firstly installed at the periphery of the pier and welded with the reserved steel bars of the pier, and then, the rubber fender is installed and anchored with the steel structure.

Figure 4:
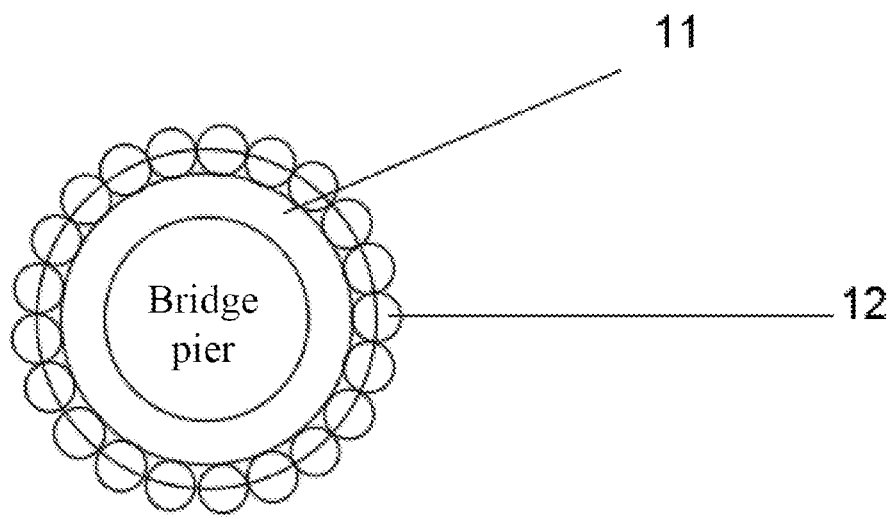
FIG. 4 is a view of a rubber and steel structure fender according to an embodiment of the disclosure.

In a specific embodiment, as shown in FIG. 4, a rubber and steel structure fender is composed of rubber fenders (12) and a steel structure fender (11). The steel structure fender (11) is composed of a horizontal plate, an outer plate and stiffeners. The stiffeners are welded with reserved steel bars of a pier, and then, the horizontal plate and the outer plate are welded so as to fix the steel structure fender (11) on the periphery of the pier. After the installation of the steel structure fender is completed, anchor rods are disposed and welded with the stiffeners of the steel structure fender, the rubber fenders (12) are hoisted, the centers of the cross sections of the rubber fenders are connected through a chain, the chain is welded and fixed, then nuts are installed and are welded and fixed with the anchor rods, and anti-rust treatment is performed on exposed steel bars. The collision kinetic energy is dissipated by elastic deformations such as compression, bending and shearing of rubber, and bending, buckling and fracture of steel members.

The disclosure can automatically identify the approach of ships, actively protect the pier, eliminate collision kinetic energy and better protect the pier, and passive anti-collision measures are set on the basis of active anti-collision measures so as to eliminate the collision kinetic energy and fully protect the pier. Furthermore, sailing ships can be pushed away from the pier in time so as to protect the ships and reduce or avoid casualties.

Embodiment II

The present embodiment discloses an intelligent integrated anti-collision method for a pier. The method can be realized based on the above embodiment, but is not limited to the system of the above specific embodiment.

Specifically including:
collecting and transmitting a distance signal and an image signal of an object close to the pier from the pier to a controller system;
controlling a hydraulic system by a control system to drive pulleys to rotate so as to enable a plurality of sections of girders to be located on the same horizontal line; and
when an object impacts an energy dissipation apparatus disposed at the tail end of the girder section, realizing energy dissipation of the energy generated by impact when the object impacts the energy dissipation apparatus.

In a specific embodiment, when a plurality of sections of girders are disposed on a pier, steel bars are pre-buried on the pier, and a bolting and welding combined joint construction manner is adopted at a joint of the pier spliced with the first section of girder;
the girders are connected through large pulleys, the tail end of the previous section of girder is welded with a pulley spindle and reinforced with an anchor rod, and the front end of the next section of girder welds and reinforces the steel bars and the pulley; and
one end of a hydraulic oil cylinder is welded with the pulley spindle, the other end is hinged to a pulley of the next section, and the other end of the hydraulic oil cylinder connected with the first pulley is welded with reserved steel bars of the pier.

In a specific embodiment, a steel structure fender is disposed on a pier and is composed of a horizontal plate, an outer plate and stiffeners;
the stiffeners are welded with the reserved steel bars of the pier, and then, the horizontal plate and the outer plate are welded so as to fix the steel structure fender on the periphery of the pier; and
after the installation of the steel structure fender is completed, anchor rods are disposed and welded with the stiffeners of the steel structure fender, rubber fenders are hoisted, the centers of the cross sections of the rubber fenders are connected through a chain, the chain is welded and fixed, then nuts are installed and are welded and fixed with the anchor rods, and anti-rust treatment is performed on exposed steel bars.

It can be understood that, in the description of this specification, the description of the reference terms such as "an embodiment", "another embodiment", "other embodiments", or "the first embodiment to the Nth embodiment" means that the specific features, structures, materials or characteristics described with reference to the embodiment or example are included in at least one embodiment or example of the present disclosure. In this specification, schematic descriptions of the foregoing terms do not necessarily directed at a same embodiment or example. Moreover, the specific features, structures, materials, or characteristics described may be combined in any one or more embodiments or examples in an appropriate manner.

The foregoing descriptions are merely exemplary embodiments of the present disclosure, but are not intended to limit the present disclosure. A person skilled in the art may make various alterations and variations to the present disclosure. Any modification, equivalent replacement, or improvement made without departing from the spirit and principle of the present disclosure shall fall within the protection scope of the present disclosure.

The invention claimed is:

1. An intelligent integrated anti-collision system for a pier, comprising:

a radar sensing device disposed at a joint between the pier and a girder, an image collection device disposed around the pier, a control system, a hydraulic system and an execution device, wherein the radar sensing device and the image collection devices transmit collected signals to the control system, and the control system uses the hydraulic system to control the action of the execution device; and the execution device is disposed at a middle part of the pier and comprises a plurality of sections of steel-reinforced rubber concrete girder connected end to end, the girder are connected through pulleys, the hydraulic system can drive the pulleys to rotate so as to enable the plurality of sections of girder to be located on the same horizontal line, and an energy dissipation apparatus is disposed at the tail end of the last girder section so as to realize energy dissipation of the energy generated by impact when an object impacts the energy dissipation apparatus.

2. The intelligent integrated anti-collision system for the pier according to claim 1, wherein the execution device uses 3 sections of small steel-reinforced rubber concrete girder, and the steel-reinforced rubber concrete girder are of a structure in which steel bars are disposed around I-steel and rubber concrete is poured so that the I-steel part and the reinforced concrete part are integrated.

3. The intelligent integrated anti-collision system for the pier according to claim 1, wherein a passive anti-collision apparatus is further disposed at a lower-middle part of the pier.

4. The intelligent integrated anti-collision system for the pier according to claim 1, wherein the hydraulic system comprises two hydraulic oil cylinders, wherein one end of a first hydraulic oil cylinder is welded with reserved steel bars of the pier, and another end the first hydraulic oil cylinder is hinged to a pulley; and one end of a second hydraulic oil cylinder is welded with a pulley spindle, and another end the second hydraulic oil cylinder is hinged to a pulley.

5. The intelligent integrated anti-collision system for the pier according to claim 2, wherein a steel plate with a certain thickness is disposed at the tail end of the last girder section, bolts are pre-buried at the tail end of the girder section, the steel plate is reserved with a circular hole, a rubber damping block is disposed at an outer side of the steel plate and is reserved with a circular hole, a steel plate is provided on an outer side of the rubber damping block and is reserved with a circular hole, each of the pre-buried bolts sequentially passes through the circular holes reserved in the steel plate, the rubber damping block and the steel plate, and the outermost steel plate is fixed through nuts.

6. The intelligent integrated anti-collision system for the pier according to claim 3, wherein the passive anti-collision apparatus is composed of rubber fenders and a steel structure fender, and the steel structure fender and the rubber fenders are sequentially disposed on a peripheral surface of the pier from inside to outside.

7. An intelligent integrated anti-collision method for a pier, comprising:

collecting and transmitting a distance signal and an image signal of an object close to the pier from the pier to a control system;

controlling a hydraulic system by the control system to drive pulleys to rotate so as to enable a plurality of sections of girder to be located on the same horizontal line; and when the object impacts an energy dissipation apparatus disposed at the tail end of the girder section, realizing energy dissipation of the energy generated by impact when the object impacts the energy dissipation apparatus.

8. The intelligent integrated anti-collision method for the pier according to claim 7, wherein when the plurality of sections of girder are disposed on the pier, steel bars are pre-buried on the pier, and a bolting and welding combined joint construction manner is adopted at a joint of the pier spliced with a first section of girder;

the girder are connected through large pulleys, the tail end of a previous section of girder is welded with a pulley spindle and reinforced with an anchor rod, and the front end of a next section of girder welds and reinforces the steel bars and the pulley; and one end of a hydraulic oil cylinder is welded with the pulley spindle, the other end is hinged to a pulley of the next section, and the other end of the hydraulic oil cylinder connected with the first pulley is welded with reserved steel bars of the pier.

9. The intelligent integrated anti-collision method for the pier according to claim 7, wherein a steel structure fender is disposed on the pier, and the steel structure fender is composed of a horizontal plate, an outer plate and stiffeners;

welding the stiffeners with reserved steel bars of the pier, and then, welding the horizontal plate and the outer plate so as to fix the steel structure fender on the periphery of the pier; and after the installation of the steel structure fender is completed, disposing and welding anchor rods with the stiffeners of the steel structure fender, hoisting rubber fenders, connecting the centers of the cross sections of the rubber fenders through a chain, welding and fixing the chain, then installing nuts, welding and fixing the nuts the anchor rods, and performing anti-rust treatment on exposed steel bars.

* * * * *